(12) United States Patent
Chino et al.

(10) Patent No.: US 8,259,145 B2
(45) Date of Patent: Sep. 4, 2012

(54) IMAGE FORMING APPARATUS WITH SCANNING POSITION CORRECTED BY NON-IMAGING LASER BEAM

(75) Inventors: Noriyuki Chino, Kawasaki (JP); Yuji Uramoto, Tokyo (JP); Shoji Kanemura, Sagamihara (JP); Kota Kiyama, Kawasaki (JP); Junji Yasuda, Kawasaki (JP); Katsuhiko Takano, Yokohama (JP); Yoshinobu Sekiguchi, Machida (JP); Noboru Koumura, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 12/785,385

(22) Filed: May 21, 2010

(65) Prior Publication Data

US 2010/0295917 A1    Nov. 25, 2010

(30) Foreign Application Priority Data

May 22, 2009 (JP) .................................. 2009-124071
May 20, 2010 (JP) .................................. 2010-116211

(51) Int. Cl.
  B41J 2/47 (2006.01)
  B41J 2/435 (2006.01)
(52) U.S. Cl. ....................................... 347/234; 347/224
(58) Field of Classification Search ................... 347/234, 347/224
See application file for complete search history.

(56) References Cited

U.S. PATENT DOCUMENTS

| 4,829,534 | A | 5/1989 | Miyazawa et al. ............... 372/46 |
| 5,734,390 | A | 3/1998 | Sakaizawa et al. ............... 347/2 |
| 5,880,766 | A | 3/1999 | Murakami et al. ............ 347/236 |
| 2009/0303561 | A1 | 12/2009 | Kiyama ..................... 359/198.1 |

FOREIGN PATENT DOCUMENTS

| JP | 9-095008 | 4/1997 |
| JP | 9-139449 | 7/1997 |
| JP | 2003-021799 | 1/2003 |
| JP | 2005-096351 | 4/2005 |
| JP | 2009-031504 | 2/2009 |
| JP | 2009031504 | * 2/2009 |

* cited by examiner

*Primary Examiner* — Stephen Meier
*Assistant Examiner* — Carlos A Martinez
(74) *Attorney, Agent, or Firm* — Fitzpatrick, Cella, Harper & Scinto

(57) ABSTRACT

An image forming apparatus capable of enhancing the accuracy of the scanning position of a laser beam to thereby obtain a more precise image. Optical sensors detect reflected light from a surface of a photosensitive drum. During image formation, the apparatus detects the scanning speed of the laser beam in a main scanning direction based on detection signals from the respective optical sensors in each of divisional sections of an image forming area in the main scanning direction. The apparatus corrects magnification of the image in the main scanning direction, based on results of detection of the scanning speed of the laser beam in the main scanning direction.

3 Claims, 16 Drawing Sheets

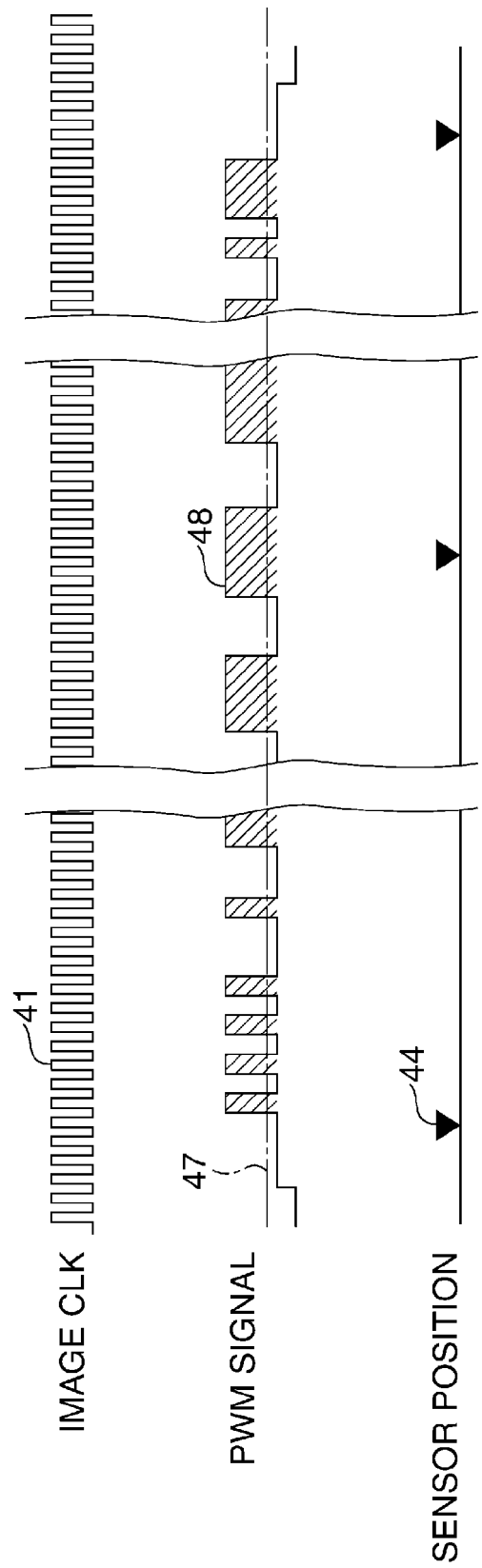

IMAGE FORMING APPARATUS WITH SCANNING POSITION CORRECTED BY NON-IMAGING LASER BEAM

BACKGROUND OF THE INVENTION

1. Field of the Invention

The present invention relates to an image forming apparatus provided with a laser emitting section for emitting a laser beam.

2. Description of the Related Art

Various techniques for enhancing the accuracy of the scanning position of a laser beam have been conventionally devised for an image forming apparatus that deflects the laser beam modulated according to an image signal using a rotary polygon mirror and causes the laser beam to scan on a photosensitive drum. To enhance the accuracy of the scanning position, a technique for measuring a trail of the laser beam has also been proposed. This technique corrects the scanning position in real time using laser-detecting sensors arranged outside the opposite ends of the photosensitive drum. More specifically, optical sensors are used to align image formation start positions in the main scanning direction to thereby adjust image formation start timing of the laser beam in the main scanning direction. Also disclosed is that optical sensors are provided so as to measure intervals of time at which the laser beam passes by the sensors, and a scanning density in the main scanning direction is corrected (e.g. Japanese Patent Laid-Open Publication No. 2003-21799).

Based on the intervals of time at which the laser beam is detected by the sensors disposed at the both ends of the photosensitive drum, it is possible to determine an average scanning speed of the laser beam between the sensors. The above-described technique can determine the average scanning speed of the laser beam for one scan in the main scanning direction, but for finer correction, e.g. correction of the jitter of a polygon mirror motor, it is required to measure the scanning speed of the laser beam in each of sections formed by dividing a length corresponding to one scan in the main scanning direction.

When the scanning speed of the laser beam in the main scanning direction is desired to be measured more finely, it is required to arrange several sensors in an image forming area in the main scanning direction. However, in a case where the sensors are thus arranged, if an image is being formed by scanning of the laser beam, portions of the image where the laser beam is blocked by the sensors are shaded, which makes it impossible to form a normal image.

SUMMARY OF THE INVENTION

The present invention provides an image forming apparatus which is capable of enhancing the accuracy of the scanning position of a laser beam to thereby obtain a more precise image.

In a first aspect of the present invention, there is provided an image forming apparatus that irradiates a laser beam on a photosensitive member to thereby form an electrostatic latent image thereon, and develops the electrostatic latent image to thereby form an image, comprising a first light source configured to emit a first light beam for use in forming the electrostatic latent image on the photosensitive drum, a second light source configured to emit a second light beam for use in obtaining reflected light thereof from a surface of the photosensitive drum, the second light beam having a wavelength at which the second light beam does not form the image on the photosensitive drum even if the photosensitive drum is exposed to the second light beam, a deflection scanning unit configured to deflect the first light beam and the second light beam such that the first light beam and the second light beam scan on the photosensitive drum, at least three optical sensors configured to detect the reflected light of the second light beam from the surface of the photosensitive member, the at least three optical sensors being arranged in a main scanning direction in which the laser beam is scanned, and a correction unit configured to detect a scanning speed of the second light beam in the main scanning direction in each of a plurality of sections formed by dividing a length of the photosensitive drum in the main scanning direction, based on respective detection signals from the optical sensors, and correct magnification of the image in the main scanning direction, based on results of detection of the scanning speed of the second light beam in the main scanning direction.

In a second aspect of the present invention, there is provided an image forming apparatus that scans a photosensitive member with a laser beam to thereby form an image on the photosensitive member, comprising an optical sensor configured to detect reflected light of the laser beam from a surface of the photosensitive member, a sub scanning direction positional displacement-detecting unit configured to detect a positional displacement of the laser beam in a sub scanning direction based on a detection signal from the optical sensor, and a positional displacement-correcting unit configured to correct the positional displacement of the image in the sub scanning direction based on a result of the detection by the sub scanning direction positional displacement-detecting unit.

According to the present invention, it is possible to measure the scanning speed of the laser beam in the main scanning direction in real time as respective scanning speeds at a plurality of positions or sections on the photosensitive drum, thereby making it possible to perform finer correction of an image. This makes it possible to enhance the accuracy of the scanning position of the laser beam to obtain a more precise image.

Further features of the present invention will become apparent from the following description of exemplary embodiments with reference to the attached drawings.

BRIEF DESCRIPTION OF THE DRAWINGS

FIG. 16 is a view useful in explaining a second example of the drive waveform of the PWM signal for driving the laser beam emitted from the laser emitting section.

DETAILED DESCRIPTION OF THE EMBODIMENTS

The present invention will now be described in detail below with reference to the accompanying drawings showing embodiments thereof.

Figure 1:
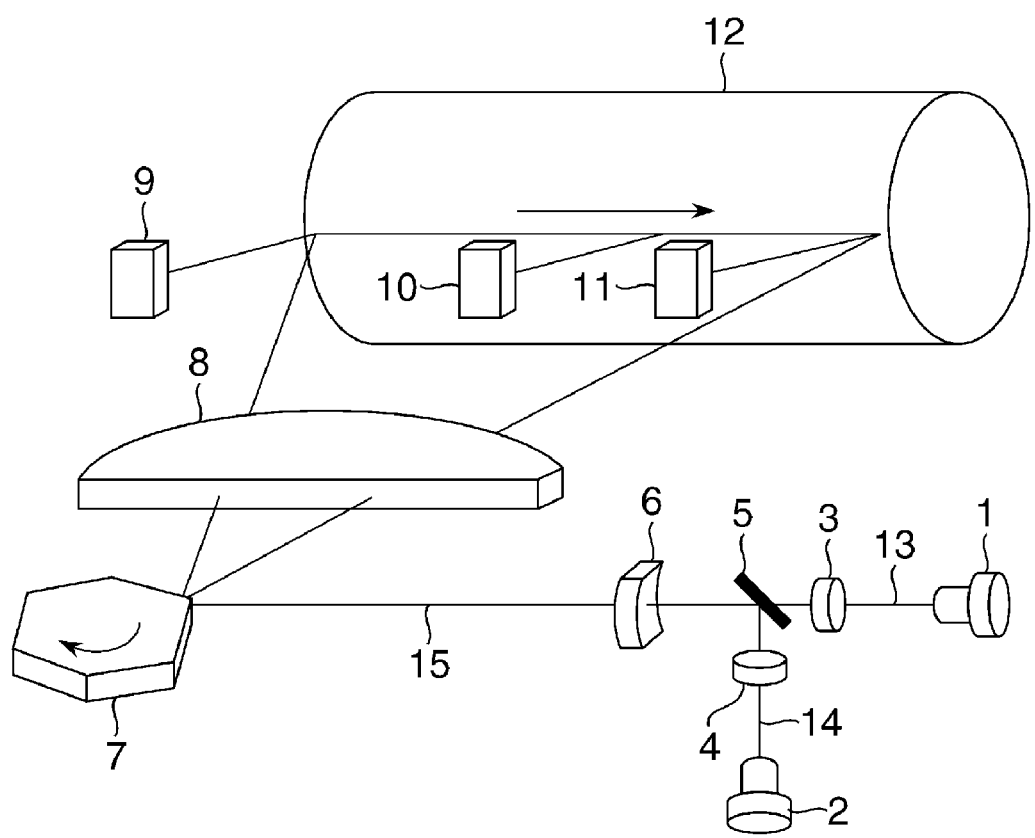
FIG. 1 is a perspective view of an optical system of an image forming apparatus according to a first embodiment of the present invention.

FIG. 1 is a perspective view of an optical system of an image forming apparatus according to a first embodiment of the present invention. In FIG. 1, the image forming apparatus comprises laser emitting sections 1 and 2, collimator lenses 3 and 4, a half mirror 5, a cylinder lens 6, a polygon mirror 7, an imaging lens 8, optical sensors 9, 10, and 11, and a photosensitive drum (photosensitive member) 12. The laser emitting section 1 emits a laser beam (first laser beam) 13 modulated according to image data. The laser emitting section 2 emits a laser beam (second laser beam) 14. The optical system shown in FIG. 1 causes the first laser beam 13 and the second laser beam 14 to scan in a direction (hereinafter referred to as "the main scanning direction) which is parallel to the rotation axis of the photosensitive drum 12.

The first laser beam 13 forms an electrostatic latent image on the photosensitive drum 12 (photosensitive member surface). The second laser beam 14 has a wavelength at which it does not change electrostatic potential on the photosensitive member surface. The second laser beam 14 may have a wavelength at which it changes electrostatic potential on the photosensitive member surface, but does not contribute to image formation at portions exposed thereto.

The second laser beam 14 is reflected by the half mirror 5 in a direction toward the polygon mirror 7, passes along the same light path 15 as the laser beam 13, and reaches the photosensitive drum 12. The laser beam 13 emitted from the laser emitting section 1 is a divergent beam but is changed into a collimated beam by passing through the collimator lens 3. Further, the laser beam 14 emitted from the laser emitting section 2 is also a divergent beam but is changed into a collimated beam by passing through the collimator lens 4.

It should be noted that instead of collimating the laser beam 13 by the collimator lens 3, the imaging lens 8 may be designed and adjusted in the disposition position thereof such that it causes the laser beam 13 to form a spot having a predetermined diameter on the photosensitive drum 12. At this time, the position of the collimator lens 4 and that of the imaging lens 8 are adjusted such that the laser beam 14 forms images on the optical sensors 9, 10, and 11.

The laser beam 13 passes along the light path 15, and is irradiated onto the polygon mirror 7. The laser beam 13 deflected for scanning passes through the imaging lens 8 and is then caused to scan on the photosensitive drum 12 having a surface thereof uniformly charged. The photosensitive drum 12 is driven for rotation in synchronism with the scanning of the laser beam 13, and the laser beam 13 is moved in a sub scanning direction with respect to the photosensitive drum 12 to thereby form an electrostatic image on the surface of the photosensitive drum 12.

After passing the half mirror 5, the laser beam 14 follows the same light path 15 as the laser beam 13 does. The laser beam 14 is irradiated onto the polygon mirror 7. The laser beam 14 deflected by the polygon mirror 7 for scanning passes through the imaging lens 8, and is then caused to scan on the photosensitive drum 12 having the surface thereof uniformly charged. Here, the laser beam 14 is for detecting a scanning speed of the laser beam, and after becoming reflected light from the surface of the photosensitive drum 12, enters the optical sensors 9, 10, and 11.

The optical sensors 9, 10, and 11 are used for detecting the scanning speed of the laser beam. The optical sensor 9 is disposed at a most upstream location of the three sensors in a direction in which the laser beam is scanned, i.e. in the main scanning direction. The optical sensors 10 and 11 are disposed at respective different locations along the main scanning direction of the laser beam such that the laser beam reflected from the photosensitive drum 12 enters each of them. As shown in FIG. 1, the optical sensor 10 is disposed at a location upstream of a location where the optical sensor 11 is disposed, in the main scanning direction. It should be noted that the optical sensor 9 is used for generating a synchronization signal indicative of a reference position on the photosensitive drum 12 for starting image formation in the main scanning direction.

The scanning speed of the laser beam scanning through a section between the optical sensors 9 and 10 is determined from the difference between a timing of delivery of an output signal from the optical sensor 9 and a timing of delivery of an output signal from the optical sensor 10. Similarly, the scanning speed of the laser beam scanning through a section between the optical sensors 10 and 11 is determined from the difference between a timing of delivery of the output signal from the optical sensor 10 and a timing of delivery of an output signal from the optical sensor 11.

Even if the photosensitive drum 12 exposed to the laser beam 14, no image is formed thereon, and hence while an electrostatic latent image is being formed on the photosensitive drum 12 by the laser beam 13, the laser beam 14 is caused to emit from the laser emitting section 2, whereby the scanning speed of the laser beam 13 can be detected.

Although in the present embodiment, the image forming apparatus is configured to be provided with three optical sensors, if a larger number of optical sensors are arranged in the image forming apparatus, it is possible to detect the scanning speed of the laser beam using sections more finely divided for speed detection. The laser beam 13 has an optimum wavelength selected therefor according to the sensitivity of the photosensitive drum 12 required for forming an electrostatic latent image thereon.

Figure 2:
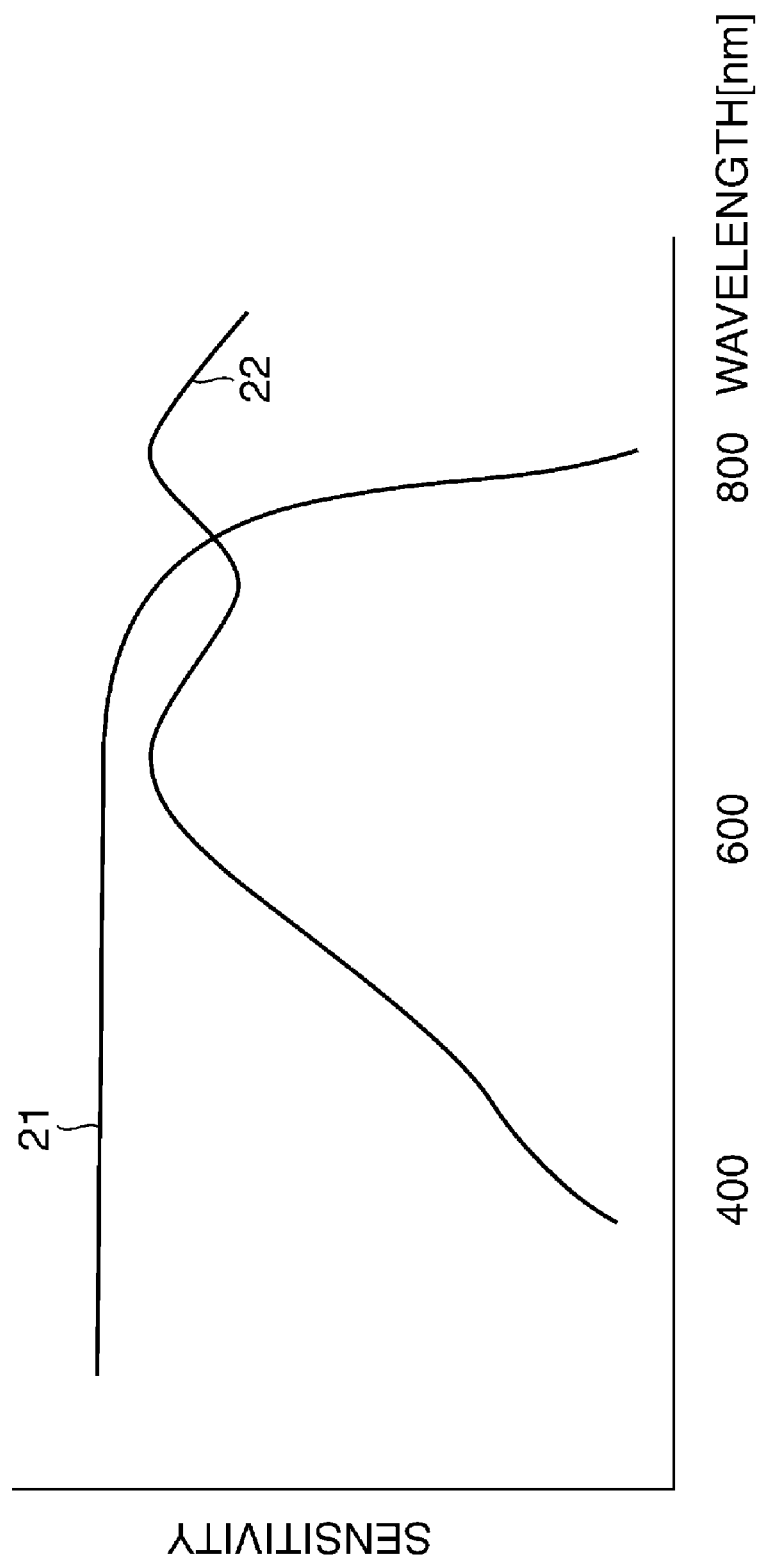
FIG. 2 is a view of sensitivities of photosensitive drums made of respective different materials.

FIG. 2 is a view of light wavelength-dependent sensitivities of different types of the photosensitive drum 12 appearing in FIG. 1, which are made of respective different materials. Reference numeral 21 denotes a typical sensitivity characteristic exhibited when selenium is used as a photosensitive material. When the photosensitive drum 12 in use has such a sensitivity characteristic, the laser beam 13 is only required to have a wavelength not longer than 600 nm, as a condition for forming an electrostatic latent image. Further, reference numeral 22 denotes a typical sensitivity characteristic exhibited when phthalocyanine is used as a photosensitive material. When the photosensitive drum 12 in use has such a sensitivity characteristic, the laser beam 13 is only required to have a wavelength in the vicinity of approximately 600 nm or 800 nm.

On the other hand, the laser beam 14 is used for the purpose of making use of its reflected light from the photosensitive drum 12, and hence the laser beam 14 is required to have a wavelength selected such that no electrostatic latent image is formed thereby. When selenium is used as a photosensitive material, as can be understood from the sensitivity characteristic 21 in FIG. 2, by using a wavelength of 800 nm or more, it is possible to detect the reflected light from the photosensitive drum 12 without adversely affecting image formation. Further, when phthalocyanine is used as a photosensitive material, as can be understood from the sensitivity characteristic 22 in FIG. 2, it only required to use a wavelength of 400 nm or less. In this case, in a region in the vicinity of 400 nm, the sensitivity of the photosensitive drum 12 is not equal to 0, but it is only required to adjust a developing bias for forming an electrostatic latent image such that only an electrostatic latent image is developed which is higher in potential level than that of an electrostatic latent image formed by a laser beam having a wavelength in the vicinity of 400 nm.

The image forming apparatus according to the present embodiment forms an electrostatic latent image on the photosensitive drum 12 by the laser beam 13, and detects the scanning speed of the the laser beam 13 performing image formation, by the laser beam 14.

Figure 3:
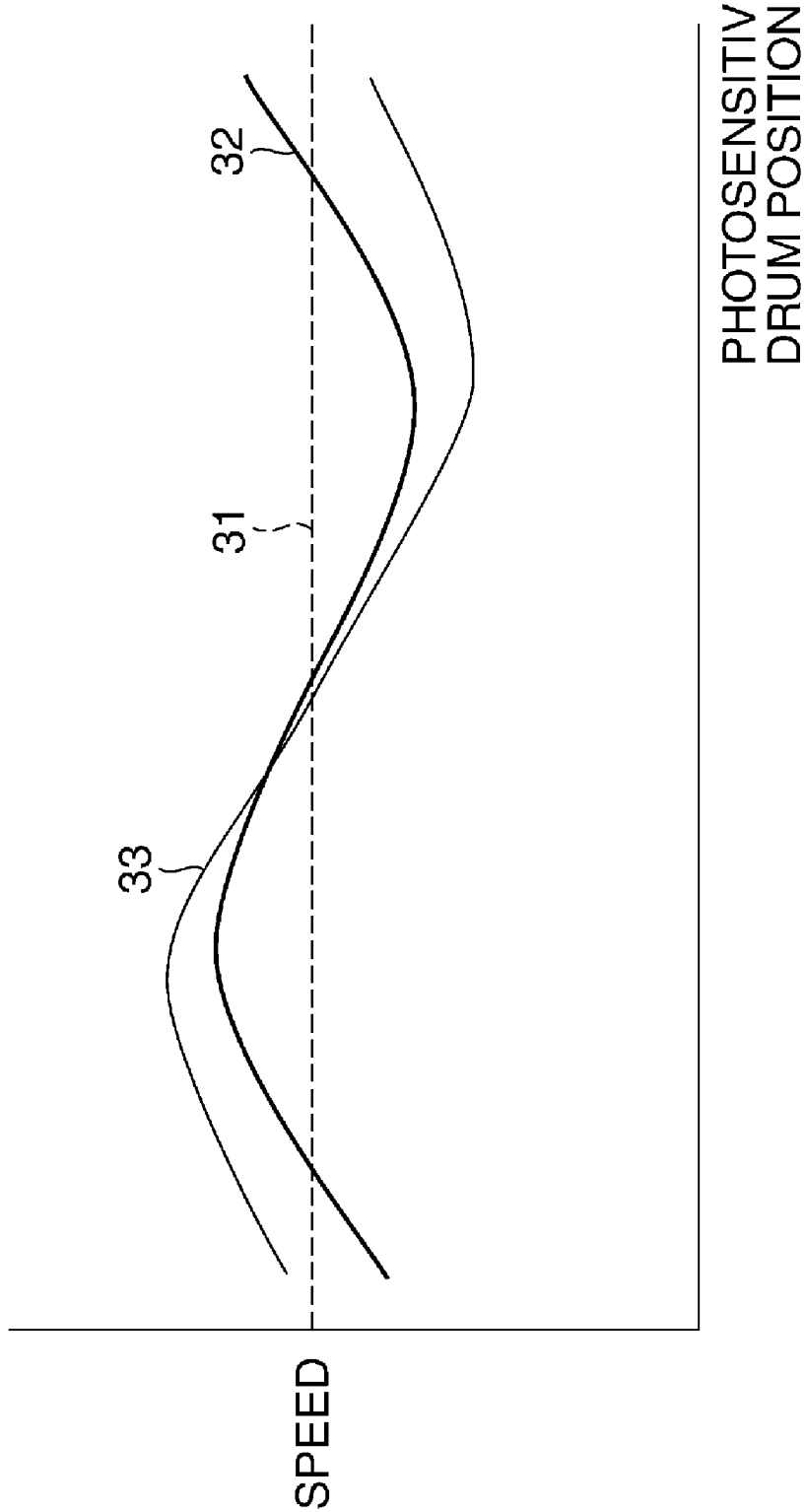
FIG. 3 is a view showing the relationship between the accuracy of an imaging lens and the scanning speed of a laser beam.

FIG. 3 is a view showing the relationship between the accuracy of the imaging lens and the scanning speed of the laser beam, in which the horizontal axis represents a scanning position on the photosensitive drum 12 in the main scanning direction, and the vertical axis represents a scanning speed of the laser beam. It is ideal that the scanning speed of the laser beam is constant with respect to the scanning position on the photosensitive drum, as represented by a straight line 31 in FIG. 3. If the scanning speed is constant, an image does not suffer from part-dependent variation in magnification thereof, and hence a high-quality image is formed.

However, in the case of rotatingly drives a polygon mirror, the actual scanning speed of the laser beam varies depending on the influence of jitter or the like. How the scanning speed of the laser beam 13 varies during one scan is represented by a curve 32 in FIG. 3. As indicated by the curve 32 in FIG. 3, the scanning speed of the laser beam 13 slightly varies with the scanning position on the photosensitive drum 12 in the main scanning direction. The image forming apparatus according to the present embodiment uses two types of the laser beams 13 and 14 having respective different wavelengths, and hence the scanning speed of the laser beam 13 for image formation and that of the laser beam 14 for scanning speed detection become different due to the chromatic aberration of the imaging lens 8. A curve 33 in FIG. 3 represents the scanning speed of the laser beam 14.

As shown in FIG. 3, the laser beam 13 and the laser beam 14 are different in scanning speed, but substantially coincide with each other in respect of variation period and phase. Therefore, the scanning speed of the laser beam 3 can be calculated from a result of detection of the canning speed of the laser beam 14.

Figure 4:
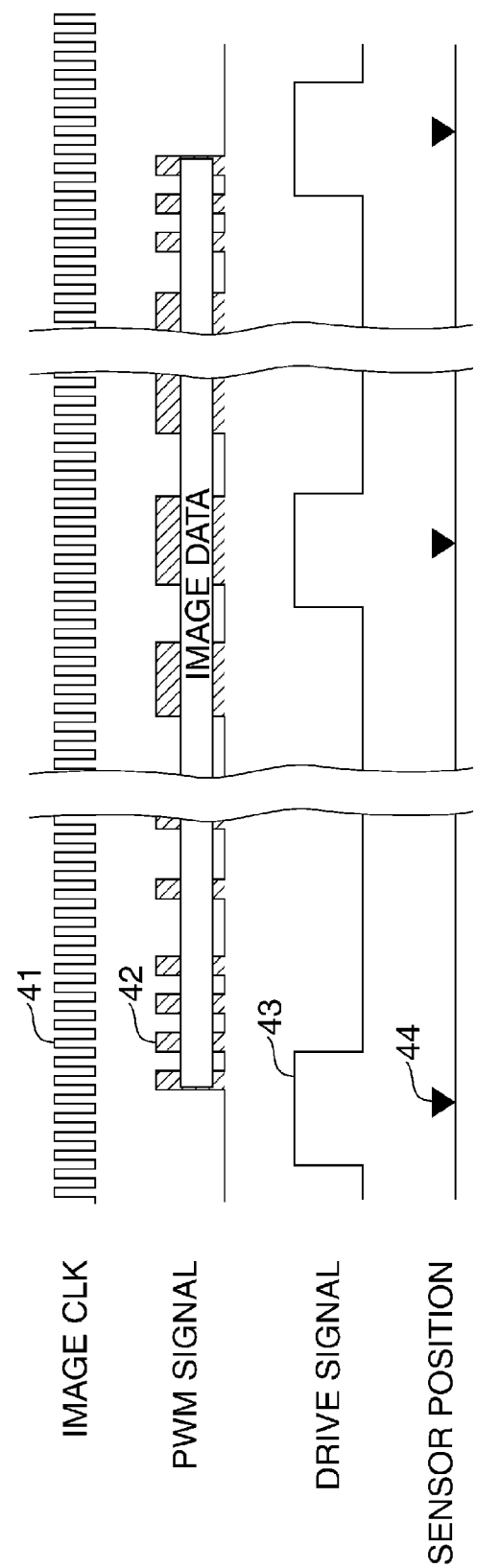
FIG. 4 is a view useful in explaining a first example of a drive signal for driving a laser beam emitted from a laser emitting section.

FIG. 4 is a view useful in explaining a first example of a drive signal 43 for driving the laser beam 14 emitted from the laser emitting section 2 appearing in FIG. 1. A waveform appearing at a highest position in FIG. 4 is that of an image clock (hereinafter referred to as the image CLK). A waveform appearing at a second highest position in the same is that of a PWM (Pulse Width Modulation) signal 42 generated based on the image CLK and image data. The PWM signal 42 is supplied to the laser emitting section 1, and the laser beam 13 is emitted based on the PWM signal 42. In FIG. 4, each portion at "H" level represents an ON state of the laser beam 13, whereas each portion at "L" level represents an OFF state of the same. A waveform at a third highest position in FIG. 4 represents the drive signal 43 which is supplied to the laser emitting section 2 so as to turn on the laser beam 14 for scanning speed detection, in each of respective timings for scanning the sensors 9, 10, and 11. In the drive signal 43, each portion at "H" level represents an ON state of the laser beam 14, whereas each portion at "L" level represents an OFF state of the same. Symbols 44 denote respective locations where the optical sensors 9, 10, and 11 each for detecting the laser light (reflected light of the laser beam 14) are disposed, and the laser light 14 for scanning speed detection is turned on only at waveform portions corresponding to the locations where the optical sensors 9, 10 and 11 are disposed.

Figure 5:
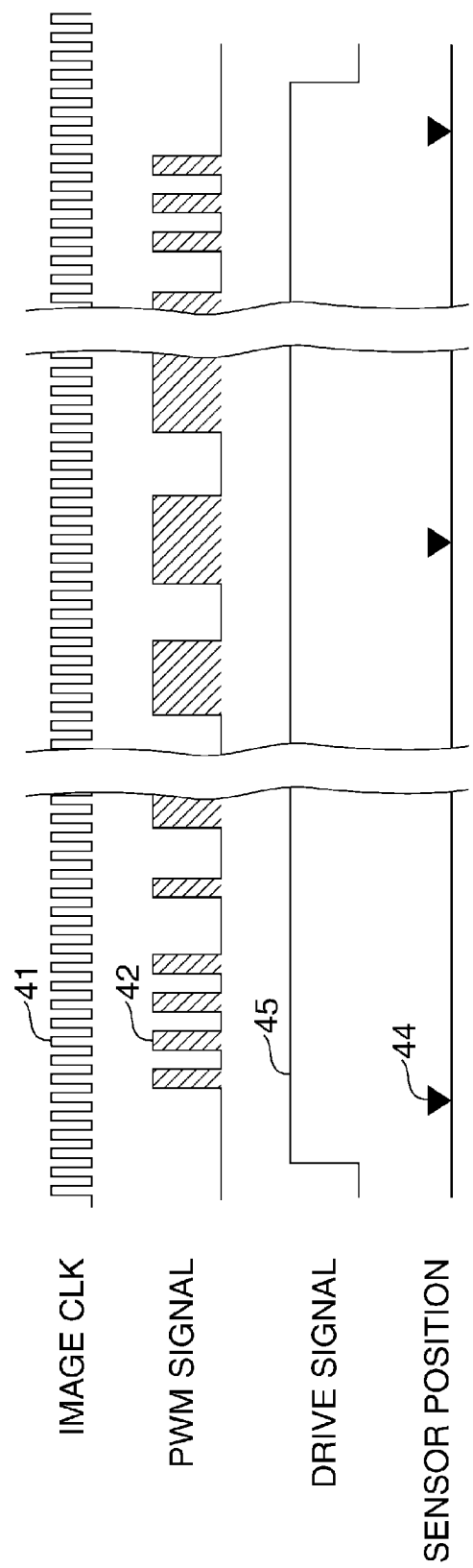
FIG. 5 is a view useful in explaining a second example of the drive signal for driving the laser beam emitted from the laser emitting section.

FIG. 5 is a view useful in explaining a second example of the drive signal 43 for driving the laser beam 14 emitted from the laser emitting section 2. Although FIG. 4 illustrates the first example in which the laser beam 14 is caused to emit from the laser emitting section 2 in each of respective timings for scanning the optical sensors 9, 10, and 11, FIG. 5 illustrates the second example where the drive signal 43 for turning on the laser beam 14 for scanning speed detection is supplied to the laser emitting section 2, for an entire image region. This is to suppress an image from being degraded in quality due to faint streaks, density variation and the like, which can be caused by irradiating the laser beam 14 only onto specific parts of the image region.

Figure 6:
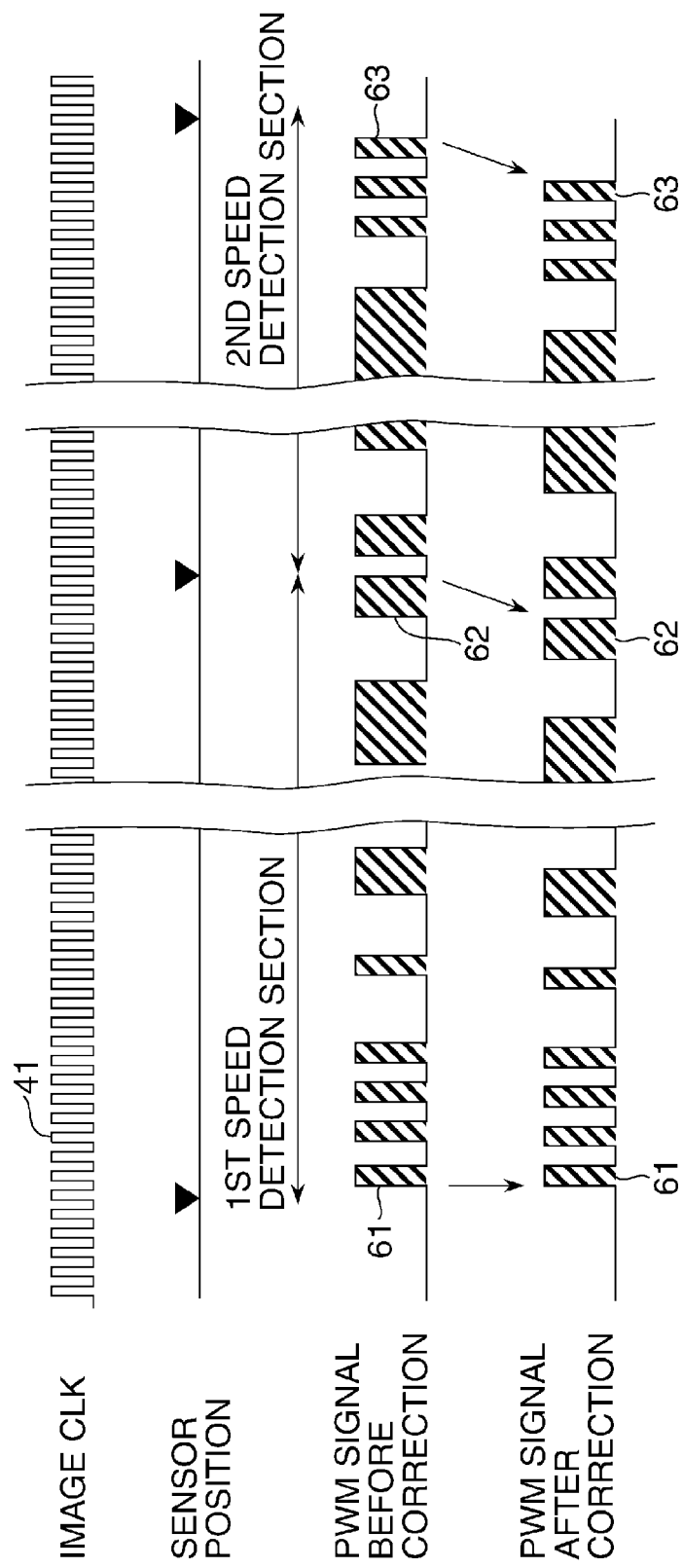
FIG. 6 is a view useful in explaining an example of correction of a drive waveform of a PWM signal appearing in FIGS. 4 and 5.

FIG. 6 is a view showing an example of correction of a drive waveform of the PWM signal appearing in FIGS. 4 and 5. A waveform at a highest position in FIG. 6 represents the image CLK. At a second highest position, there are indicated locations where the optical sensors are disposed, for convenience sake. A waveform at a third highest position in the same represents a PWM signal before correction, whereas a waveform at a lowest position in the same represents a PWM signal after correction.

The frequency of the image CLK at a first speed detection section is corrected based on the scanning speed detected by the optical sensors 9 and 10. The frequency of the image CLK at a second speed detection section is corrected based on the scanning speed detected by the optical sensors 10 and 11.

To begin with, it is assumed that when image formation is performed at a predetermined reference scanning speed, the image CLK has a reference frequency. Therefore, if the scanning speed is equal to the reference scanning speed, the PWM signal is generated using the image CLK having the reference frequency. However, if the scanning speed is higher than the reference scanning speed, the frequency of the image CLK is made higher than the reference frequency so as to suppress variation in image size. On the other hand, if the scanning speed is lower than the reference scanning speed, the frequency of the image CLK is made lower than the reference frequency so as to suppress variation in image size.

In the image forming apparatus according to the embodiment, variation in the scanning speed is detected in each of a plurality of scanning sections defined by dividing the length of an image forming area on the photosensitive drum 12 in the main scanning direction, using the optical sensors 9, 10, and 11, and the frequency of the image CLK is changed based on a result of the detection.

FIG. 6 shows an example in which the scanning speed at the first speed detection section is higher than the reference scanning speed, and the scanning speed at the second speed detection section is equal to the reference scanning speed. In the first speed detection section, image formation is performed using the image CLK having a higher frequency than that of the reference image CLK to be used when image formation is performed at the reference scanning speed. Therefore, by generating the PWM signal using this image CLK, time between a waveform portion 61 and a waveform portion 62 contained in the PWM signal after correction is shorter than that between the waveform portion 61 and the waveform portion 62 contained in the PWM signal before correction, whereby the magnification of an image is changed into one suitable for the scanning speed.

On the other hand, the scanning speed at the second speed detection section is equal to the reference scanning speed, which makes it unnecessary to change the frequency of the image CLK. Therefore, the image CLK is changed between the first speed detection section and the second speed detection section. In the second speed detection section, the PWM signal is generated using the reference image CLK 41, and hence time between the waveform portion 62 and a waveform portion 63 contained in the PWM signal after correction is equal to that between the wave 62 and the wave 63 contained in the PWM signal before correction.

Although FIG. 6 is not depicted in a manner such that a change in frequency in the image CLK 41 is visually apparent, actually, the frequency of the image CLK 41 is changed between the first speed detection section and the second speed detection section. Further, in the present embodiment, as a method of changing the magnification of an image in the main scanning direction, there is described a method of changing the frequency of the image CLK, by way of example, the magnification of the image in the main scanning direction may be changed by changing image data while causing the image CLK to remain fixed to the reference frequency.

Figure 7:
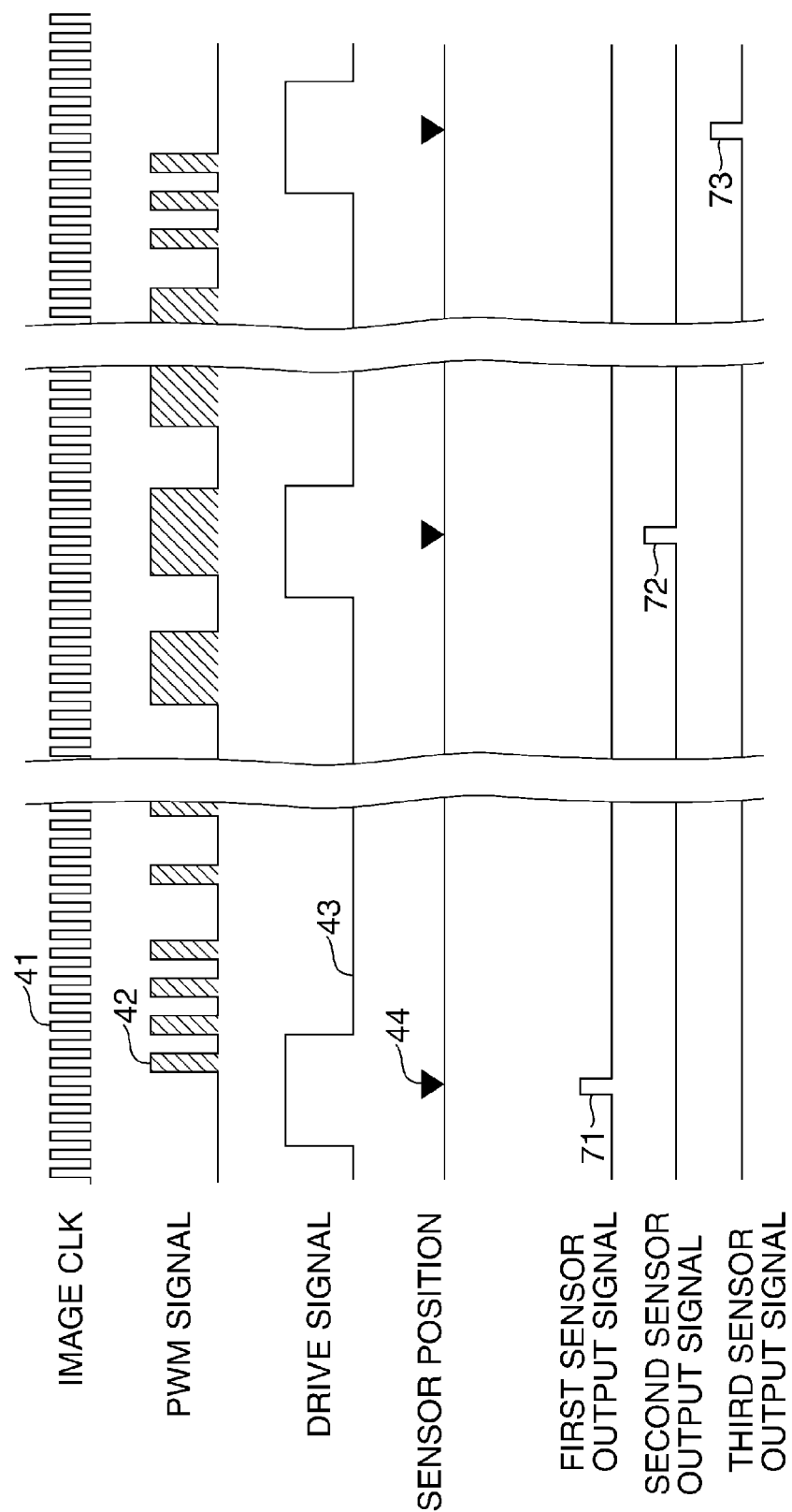
FIG. 7 is a view useful in explaining an example of timings at which output signals are delivered from respective optical sensors.

FIG. 7 shows the respective output signals delivered from the optical sensors 9, 10, and 11 when the laser beam 14 has sequentially scanned them. In FIG. 7, elements identical to those appearing in FIGS. 4 to 6 are denoted by the same reference numerals.

A first sensor output signal represents the output signal from the optical sensor 9, a second sensor output signal represents the output signal from the optical sensor 10, and a third sensor output signal represents the output signal from the optical sensor 11, and rising edges 71, 72, and 73 correspond to respective timings in which the optical sensors 9, 10, and 11 detect the laser beam 14.

Figure 8:
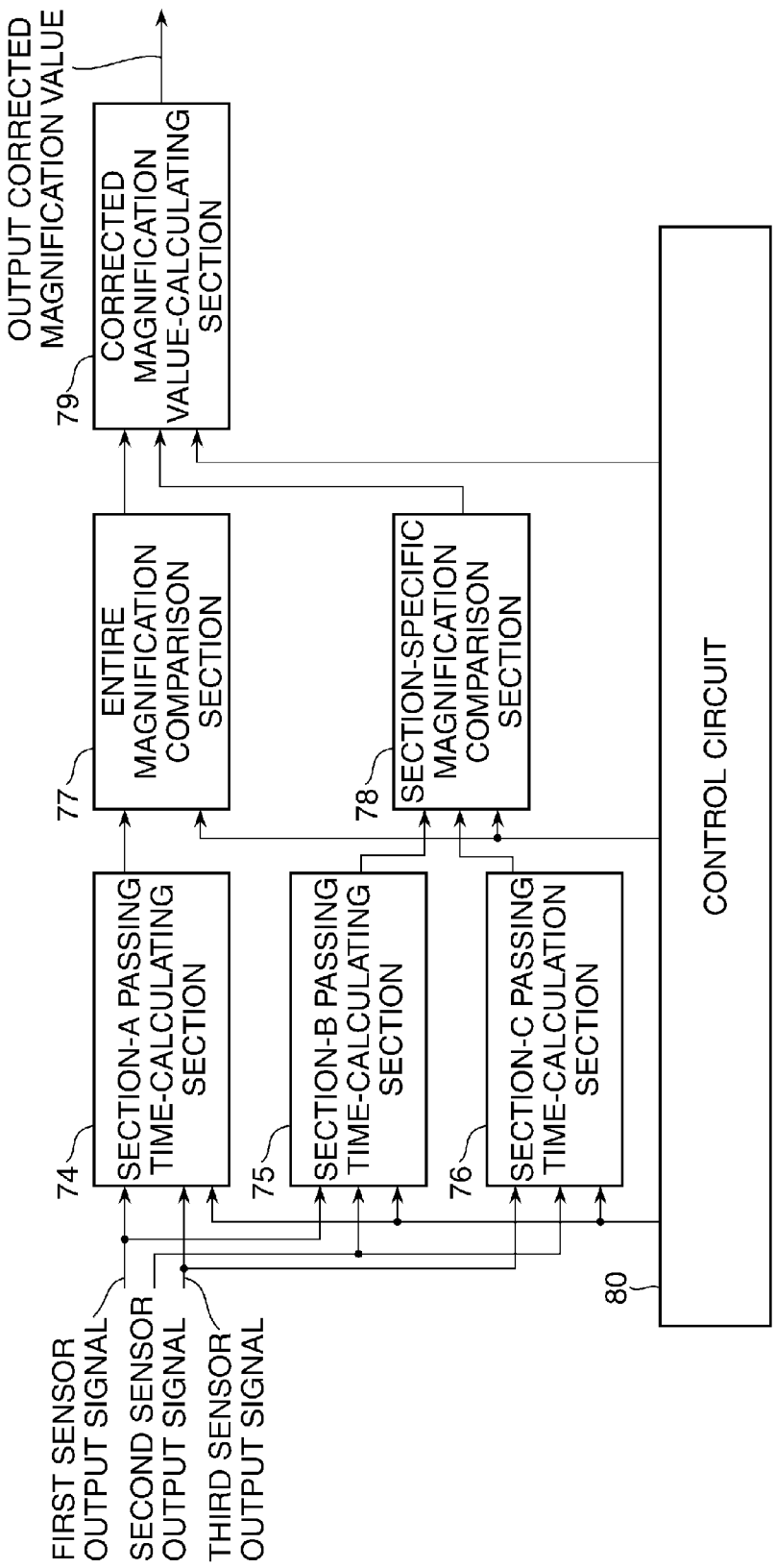
FIG. 8 is a block diagram of a magnification correction calculation circuit.

FIG. 8 is a block diagram of a magnification correction calculation circuit to which the first to third sensor output signals are input. This circuit may be implemented by software for processing operations or by hardware such as an electric circuit).

A section-A passing time-calculating section 74 calculates a time period taken for the laser beam 14 to pass through a section A (corresponding to the entire speed detection section: the first speed detection section+the second speed detection section in FIG. 6) using the first sensor output signal and the third sensor output signal. A section-B passing time-calculating section 75 calculates a time period taken for the laser beam 14 to pass through a section B (corresponding to the first speed detection section in FIG. 6) using the first sensor output signal and the second sensor output signal.

Similarly, a section-C passing time-calculation section 76 calculates a time period taken for the laser beam 14 to pass through a section C (corresponding to the second speed detection section in FIG. 6) using the second sensor output signal and the third sensor output signal. Since the section-A passing time-calculating section 74 calculates the time period taken for the laser beam 14 to pass through the entire image forming area, that is, the entire image forming area passing time, an entire magnification comparison section 77 calculates a deviation of an entire-area magnification covering the entire image forming area from a reference value, by comparing the calculated entire image forming area passing time with a predetermined reference value input from a control circuit 80. On the other hand, a section-specific magnification comparison section 78 calculates respective deviations of section-specific magnifications from respective references values thereof associated with the section B (first speed detection section) and the section C (second speed detection section), by comparing the time period taken for the laser beam 14 to pass through the section B and the time period taken for the laser beam 14 to pass through the section C, with respective predetermined reference values input from the control circuit 80. A corrected magnification value-calculating section 79 calculates a corrected magnification value based on the deviation of the entire-area magnification calculated by the entire magnification comparison section 77, the deviations of the section-specific magnifications calculated by the section-specific magnification comparison section 78, and predetermined control inputs from the control circuit 80, and outputs the corrected magnification value.

The control circuit 80 manages the above calculation process, and sets the reference values based on data for correction of registration.

To correct a magnification based on the corrected magnification value, there may be employed any of a method of changing the frequency of an image clock, a method of inserting and removing data corresponding to a plurality of auxiliary pixels constituting a pixel (see e.g. Japanese Patent Laid-Open Publication No. 2005-096351), and so forth.

Figure 9:
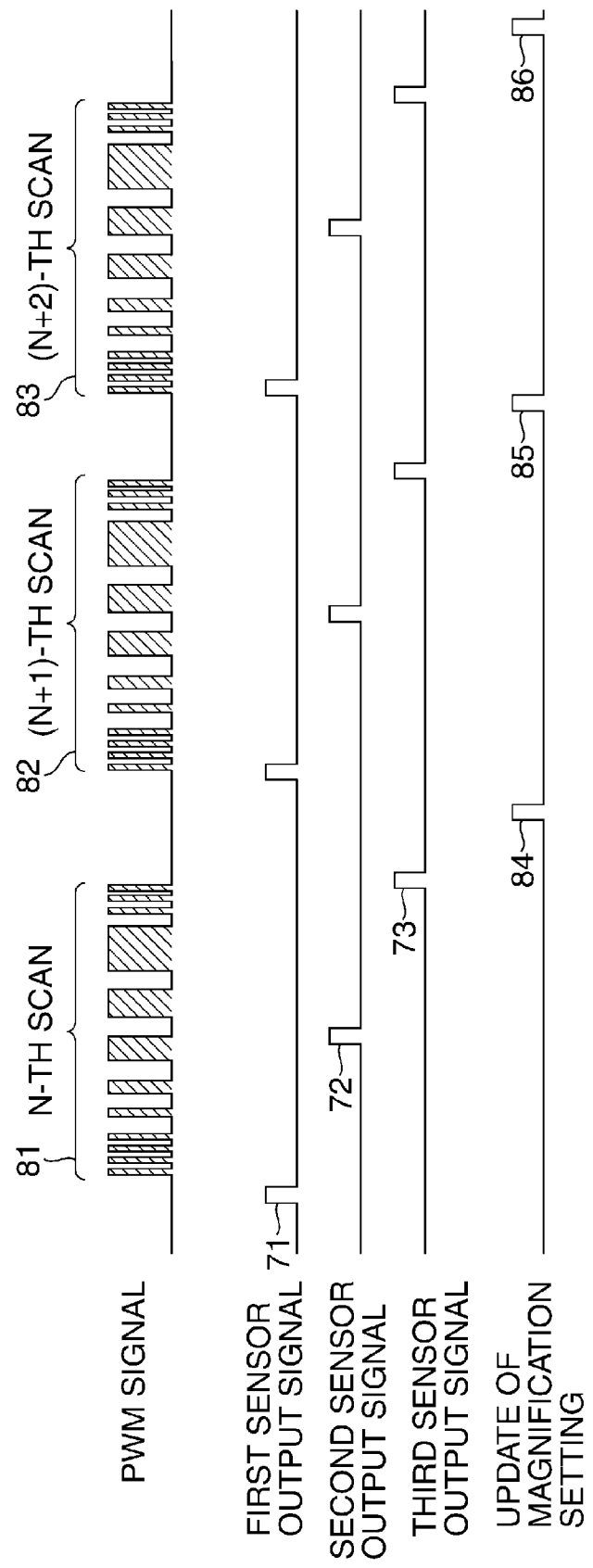
FIG. 9 is a timing diagram showing reflection timing for reflecting a magnification value.

FIG. 9 is a timing diagram showing reflection timing for reflecting a magnification value (magnification correction). In FIG. 9, there are shown timings of magnification correction performed when image formation based image data has been performed by three scans. The magnification correction calculation is started upon detection of the rising edge 73 of the third sensor output signal delivered from the optical sensor 11 during image formation based image data by a first scan 81 (n-th scan), and a setting 84 of a magnification value is completed before image formation by a second scan 82. The same processing is carried out also for the second scan 82 ((n+1)-th scan) and a third scan 83 ((n+2)-th scan).

Figure 10:
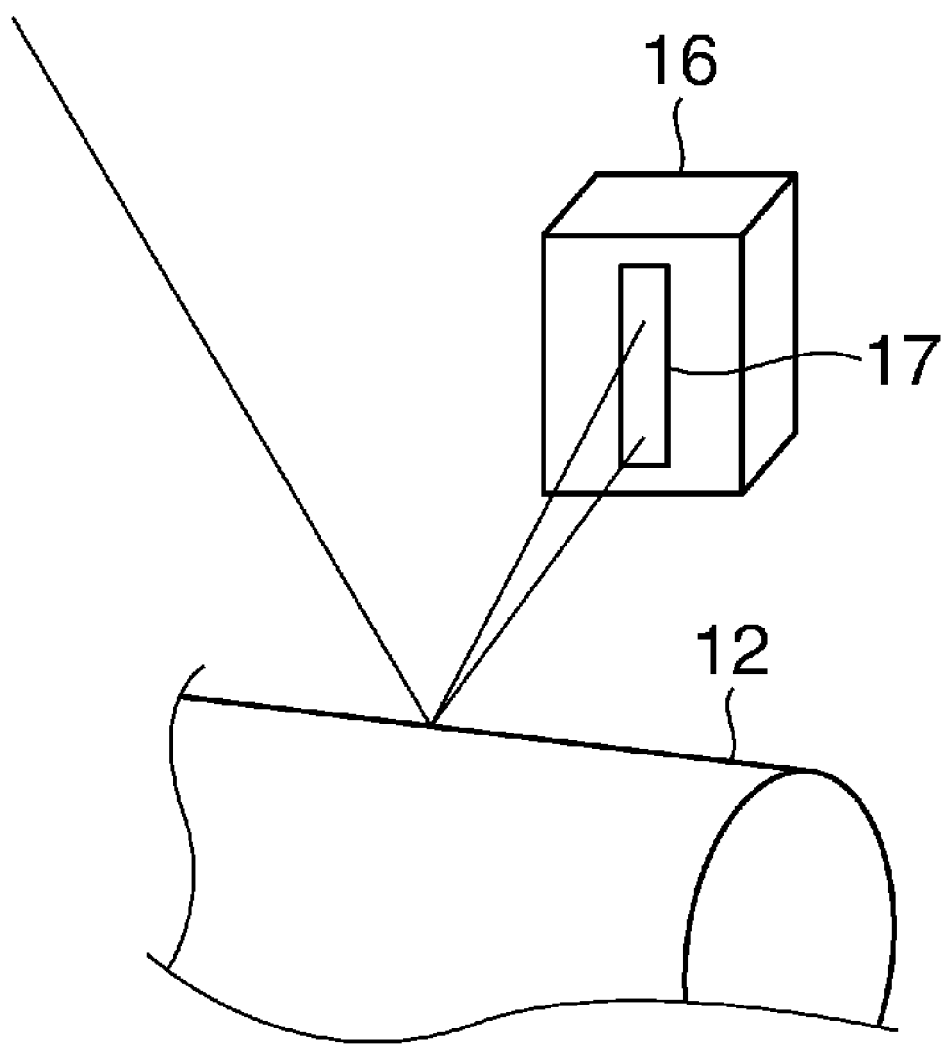
FIG. 10 is a view of an optical sensor for detecting a positional displacement in a sub scanning direction.

FIG. 10 is a view of an optical sensor 16 for detecting a positional displacement in the sub scanning direction in the image forming apparatus in FIG. 1. The laser beam 14 reflected from the photosensitive drum 12 enters the optical sensor 16. The optical sensor 16 includes a light receiving section 17 which is capable of detecting a positional displacement of the photosensitive drum 12 in the sub scanning direction, and hence is capable of detecting an amount of the positional displacement of the photosensitive drum 12 in the sub scanning direction.

Next, a description will be given of correction of the positional displacement in the sub scanning direction performed based on the amount of the positional displacement in the sub scanning direction detected by the optical sensor 16 shown in FIG. 10. Degradation of image quality due to the positional displacement is caused by a displacement of respective relative positions of electrostatic latent images formed on a plurality of photosensitive drums during color image formation. Therefore, when attention is paid to the positional relationship between latent images formed on two photosensitive drums, by adjusting the positional relationship in advance e.g. by auto registration adjustment such that the latent images properly overlap each other, and holding the adjusted positional relationship, the positional displacement in the sub scanning direction can be corrected.

Figure 11:
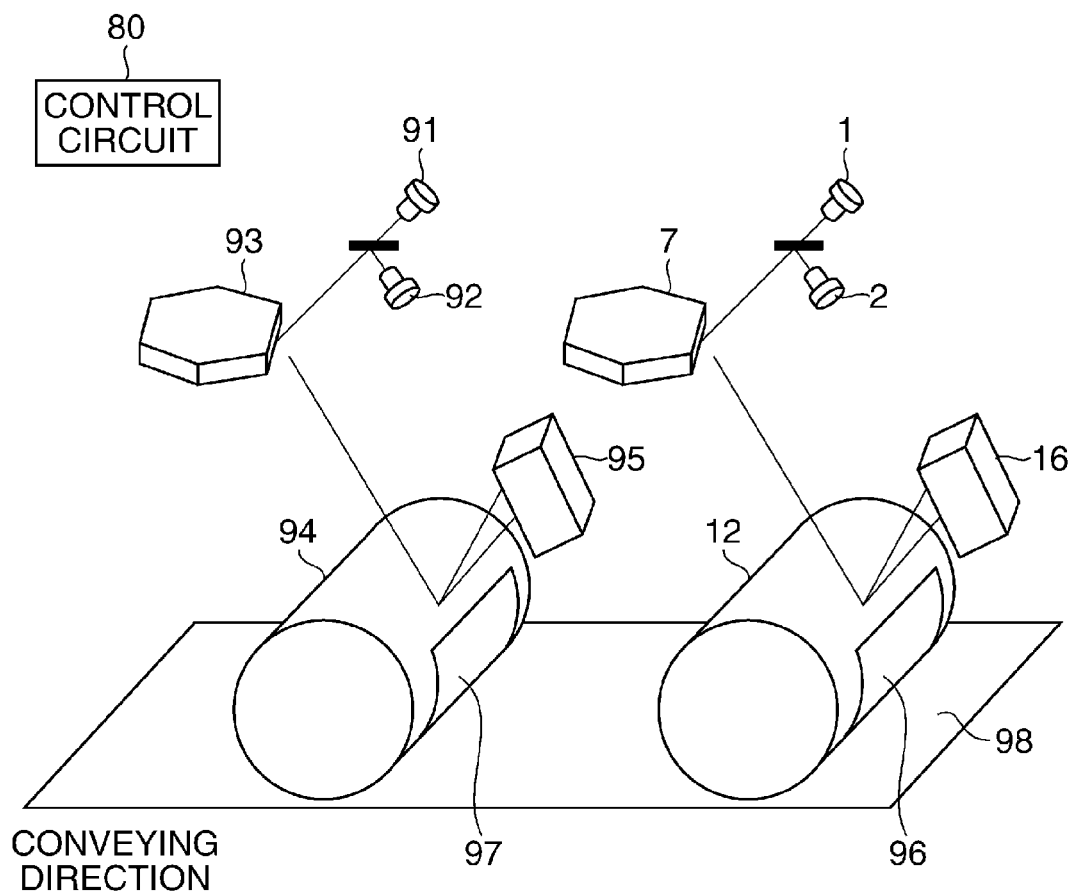
FIG. 11 is a schematic view of an arrangement necessary for correcting the positional displacement in the sub scanning direction.

FIG. 11 is a schematic view of an arrangement necessary for correcting the positional displacement in the sub scanning direction, which particularly illustrates the positional relationship between the two photosensitive drums and the positional relationship between sensors. In FIG. 11, some of elements unnecessary for description of the arrangement is omitted. The present arrangement comprises the laser emitting sections 1, 2, laser emitting sections 91, 92, the polygon mirror 7, a polygon mirror 93, the first photosensitive drum 12, a second photosensitive drum 94, and the first optical sensor 16 and a second optical sensor 95 which are capable of detecting a positional displacement in the sub scanning direction. The control circuit 80 not only drives the photosensitive drums 12 and 94 using a drive system (not shown) but also controls the conveyance of a sheet 98, etc. Further, reference numeral 96 denotes an image formed on the first photosensitive drum 12, and reference numeral 97 denotes an image formed on the second photosensitive drum 94.

In the above arrangement, to correct the amount of a positional displacement in the sub scanning direction, it is only required to calculate the amount of the positional displacement based on the difference between an output value from the first optical sensor 16 and an output value from the second optical sensor 95, and then correct the positional displacement.

Figure 12A:
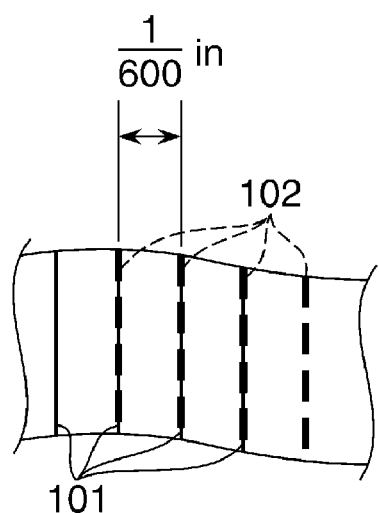
FIGS. 12A and 12B are schematic views of respective images formed on sheets.
Figure 12B:
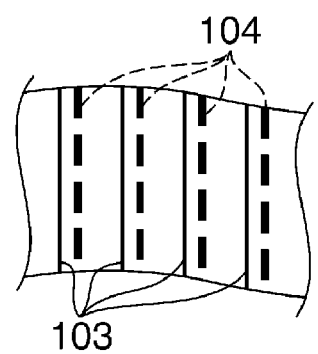

FIGS. 12A and 12B show respective images formed on sheets 98. Images 101 and 103 are formed by transfer of an image formed on the first photosensitive drum 12 appearing in FIG. 11 to a sheet 98, and images 102 and 104 are formed by transfer of an image formed on the second photosensitive drum 94 to a sheet 98. In FIGS. 12A and 12B, the images (pixels) are formed e.g. at intervals of 1/600 inches corresponding to a resolution of 600 dpi. It should be noted that in FIGS. 12A and 12B, the intervals are shown in an exaggerated manner, for clarity purposes.

Now, to correct the amount of the positional displacement in the sub scanning direction, when the images 102 and 104 formed on the second photosensitive drum are displaced from each other by an amount corresponding to one scan, as shown in FIG. 12a, it is possible to correct the amount of the positional displacement by making image formation timing earlier by one scan, i.e. by shifting image data for the image formation by an amount corresponding to one scan. Further, as shown in FIG. 12B, when the images 102 and 104 are displaced from each other by less than an amount corresponding to one scan, it is possible to correct the amount of the positional displacement by shifting the phase angle of the polygon mirror 93 with respect to the polygon mirror 7.

Figure 13:
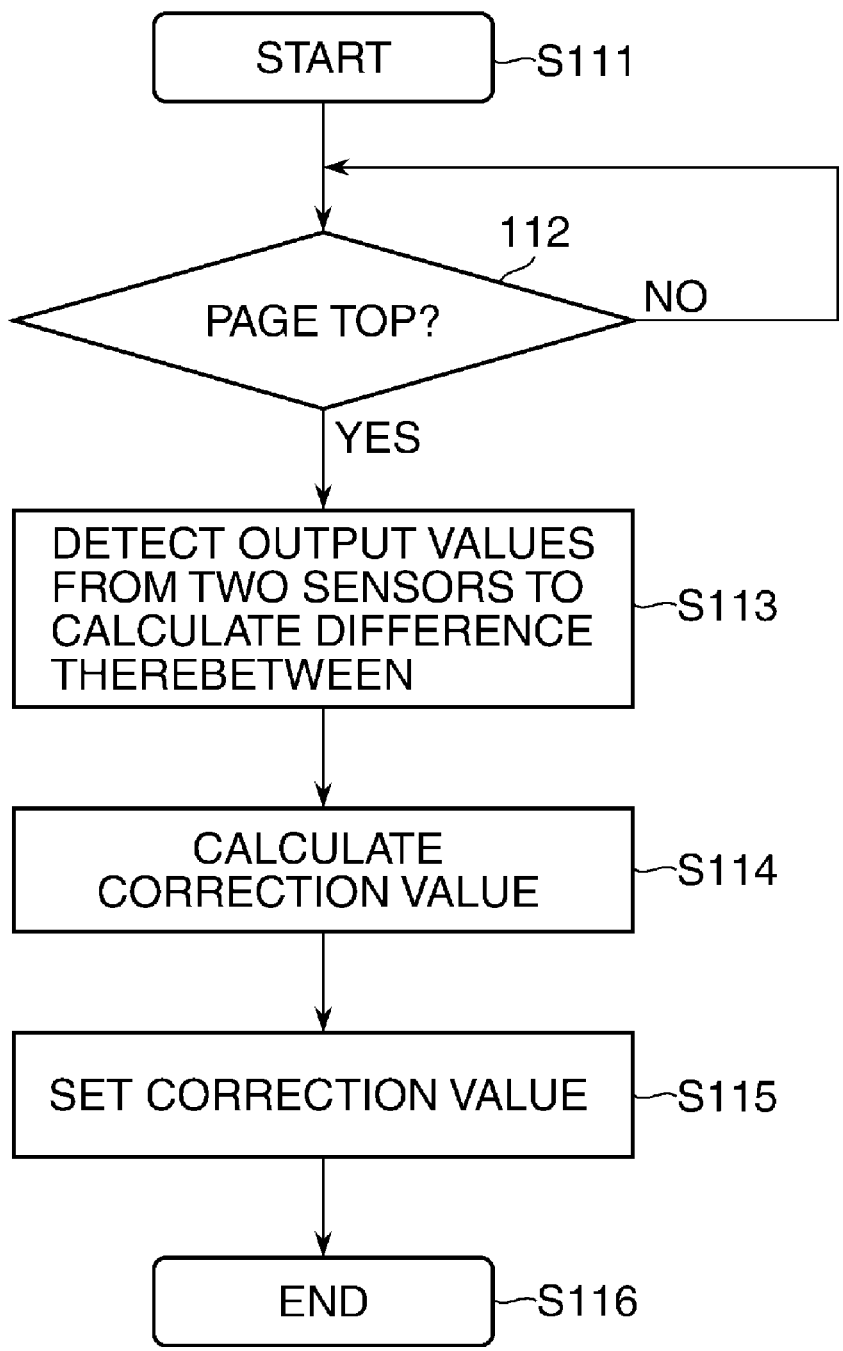
FIG. 13 is a flowchart of a process for correcting a positional displacement in the sub scanning direction.

FIG. 13 is a flowchart of a process for correcting a positional displacement in the sub scanning direction. First, a correction operation is started (step S111), and it is determined whether or not a top of a page as a unit of image formation is detected (step S112). Upon detection of the top of the page, the respective output values from the first optical sensor 16 and the second optical sensor 95, which are arranged in the respective vicinities of the two photosensitive drums different from each other for detecting the positional displacement in the sub scanning direction, are detected to calculate the difference between the output values (step S113). At this time, assuming that the correction is performed with reference to the output of the first optical sensor 16 disposed in the vicinity of the first photosensitive drum 12, the difference between the output values is calculated by the following equation:

Difference between output values=second sensor output−first sensor output

Next, a correction value is calculated based on the difference between the output values (step S114). Here, an amount of change of image data for image formation and an amount of change of the phase angle of the polygon mirror 93 are calculated as the correction value. The correction value is set in the control circuit 80 for controlling the second photosensitive drum 94 (step S115), whereby the correction operation is completed (step S116).

Next, a second embodiment of the present invention will be described. Although in the first embodiment, two types of laser beams (the laser beams 13 and 14) are used, in the second embodiment, only one type of image forming laser beam, i.e. the laser beams 13 is used for both of image formation and detection of the scanning speed.

Figure 14:
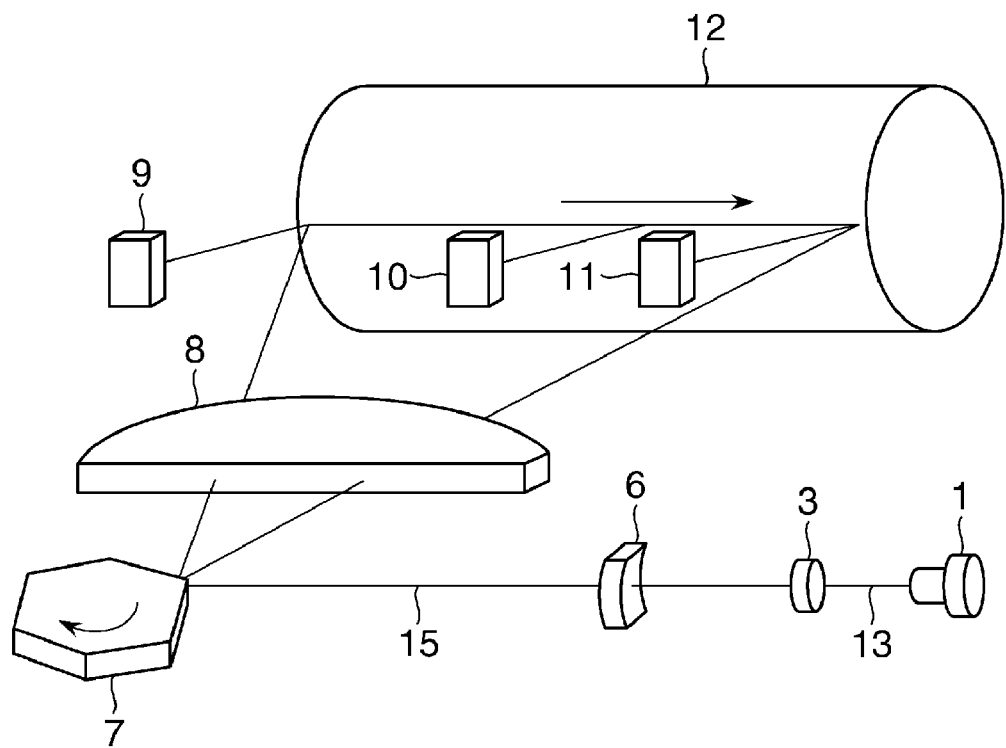
FIG. 14 is a perspective view of an optical system of an image forming apparatus according to a second embodiment of the present invention.
Figure 15:
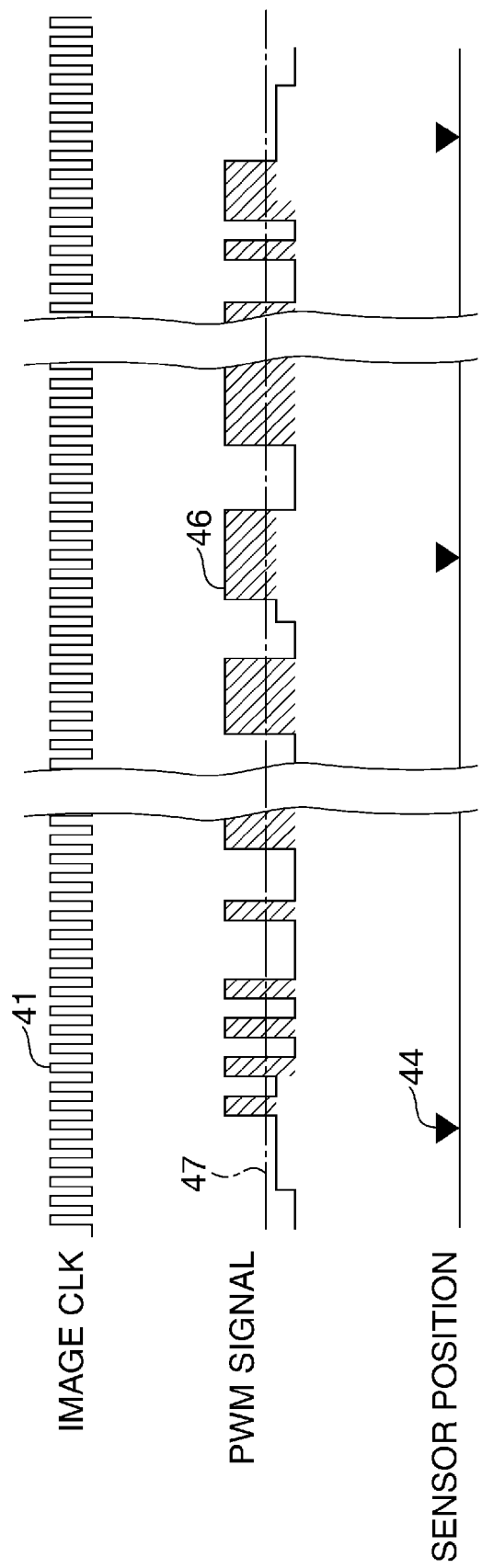
FIG. 15 is a view useful in explaining a first example of a drive waveform of a PWM signal for driving a laser beam emitted from a laser emitting section.

FIG. 14 is a perspective view of an optical system of an image forming apparatus according to the second embodiment of the present invention. The optical system of the image forming apparatus according to the second embodiment has the same arrangement as that of the image forming apparatus according to the first embodiment, except that it does not include the laser emitting section 2, the collimator lens 4, and the half mirror 5, and therefore detailed description thereof is omitted. With this arrangement, the laser beam 13 is driven as in a first example shown in FIG. 15. That is, as indicated by a drive waveform 46, the laser beam 13 is irradiated in an amount less than the level of a developing bias 47 even at a sensor position outward of an image forming area.

This makes it possible for the optical sensors 9, 10, and 11 to obtain a light amount required for detecting the scanning speed not only at a location where an image is formed but also at a location where no image is formed. Alternatively, as indicated by a drive waveform 48 in a second example shown in FIG. 16, by making the amount of the laser beam 13 irradiated at less than the level of the developing bias 47 always constant, it is possible to obtain an excellent image with no image irregularities.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-124071, filed May 22, 2009, and Japanese Patent Application No. 2010-116211, filed May 20, 2010, which are hereby incorporated by reference herein in its entirety.

What is claimed is:

1. An image forming apparatus that irradiates a laser beam on a photosensitive member to thereby form an electrostatic latent image thereon, and develops the electrostatic latent image to thereby form an image, comprising:
   a first light source configured to emit a first light beam for forming the electrostatic latent image on the photosensitive drum;
   a second light source configured to emit a second light beam for obtaining reflected light thereof from a surface of the photosensitive drum, the second light beam having a wavelength at which the second light beam does not form the image on the photosensitive drum even if the photosensitive drum is exposed to the second light beam;

a deflection scanning unit configured to deflect the first light beam and the second light beam such that the first light beam and the second light beam scan on the photosensitive drum;

at least three optical sensors configured to detect the reflected light of the second light beam from the surface of the photosensitive member, said at least three optical sensors being arranged in a main scanning direction in which the laser beam is scanned; and a correction unit configured to detect a scanning speed of the second light beam in the main scanning direction in each of a plurality of sections defined by dividing a length of an image forming area on the photosensitive drum in the main scanning direction, based on respective detection signals from said optical sensors, and correct magnification of the image in the main scanning direction, based on results of detection of the scanning speed of the second light beam in the main scanning direction.

2. The image forming apparatus according to claim 1, further comprising a control unit configured to control said second light source such that the second light beam is emitted therefrom at least in timings associated with respective locations where said at least three optical sensors are disposed.

3. The image forming apparatus according to claim 1, wherein the first light beam is a laser beam having a wavelength at which the first light beam is capable of forming the image on the photosensitive member, and the second light beam is irradiated in an amount of light less than a level of a developing bias.

* * * * *